United States Patent [19] [11] Patent Number: 5,866,754
De Blangy et al. [45] Date of Patent: Feb. 2, 1999

[54] METHOD AND APPARATUS FOR PROCESSING AND EXPLOITING WASTE BY TRANSFORMING IT INTO MATERIALS THAT ARE NON-POLLUTING AND REUSABLE

[75] Inventors: Gerard De Blangy, Domaine du Petit Saint-Paul, 13480 Rognes; Jean Bommelaer, Le Canet, both of France

[73] Assignee: Gerard De Blangy, Rognes, France

[21] Appl. No.: 448,412

[22] PCT Filed: Dec. 1, 1993

[86] PCT No.: PCT/FR93/01181

§ 371 Date: Aug. 11, 1995

§ 102(e) Date: Aug. 11, 1995

[87] PCT Pub. No.: WO94/13361

PCT Pub. Date: Jun. 23, 1994

[30] Foreign Application Priority Data

Dec. 7, 1992 [EP] European Pat. Off. ............. 92430034

[51] Int. Cl.$^6$ ................................ A62D 3/00; B09D 3/00
[52] U.S. Cl. .......................... 588/230; 588/256; 588/257; 106/624; 106/697
[58] Field of Search ..................... 588/256, 257, 588/900, 236; 422/299, 184.1; 106/624, 697

[56] References Cited

U.S. PATENT DOCUMENTS

| 4,077,847 | 3/1978 | Choi et al. | 209/3 |
| 4,116,705 | 9/1978 | Chappell | 106/DIG. 1 |
| 4,192,745 | 3/1980 | Hood | 106/713 |
| 4,853,208 | 8/1989 | Reimers et al. | 588/256 |
| 4,919,568 | 4/1990 | Wittenzelliner | 405/128 |
| 4,919,722 | 4/1990 | Vasquez et al. | 106/697 |

FOREIGN PATENT DOCUMENTS

| 0427899 | 5/1991 | European Pat. Off. . | |
| 2583742 | 12/1986 | France . | |
| 2612427 | 9/1988 | France . | |
| 3909060 | 9/1990 | Germany . | |
| 55-149673 | 11/1980 | Japan | 588/256 |
| 59-019540 | 2/1984 | Japan | 422/229 |
| 9221409 | 12/1992 | WIPO . | |

Primary Examiner—Michael L. Lewis
Assistant Examiner—Peter DiMauro
Attorney, Agent, or Firm—Ladas & Parry

[57] ABSTRACT

According to the invention, apparatus for processing and exploiting previously ground-up waste (1) that has had any ferrous metal content cleared therefrom and that has a water content lying in a given range, comprises a reaction chamber (21) enabling mineralizing agents to be added and to react therewith, the agents including at least an alkaline-earth hydroxide such as quicklime and an alkaline-earth salt such as calcium carbonate, reaction taking place at a temperature greater than 130° C. and less than the pyrolysis temperature of the components of the waste that are most sensitive to being decomposed by heat. Said reaction chamber (21) includes at least one continuous hopper (16) enclosing at least one Archimedes' screw (15) that is rotated therein, which hopper comprises a plurality of successive chambers (22) into each of which one of said mineralizing agents is injected; said Archimedes' screw (15) serving firstly to perform continuous, intimate, and uniform mixing of the particles and the mineralizing agents added thereto, and secondly to keep the grain size to less than 1 mm.

16 Claims, 2 Drawing Sheets

METHOD AND APPARATUS FOR PROCESSING AND EXPLOITING WASTE BY TRANSFORMING IT INTO MATERIALS THAT ARE NON-POLLUTING AND REUSABLE

The present invention relates to a method and to apparatus for processing and recovering waste material by transforming it into material which is non-polluting and reusable.

The technical field of the invention is that of making equipment for processing waste in order to avoid storing it in landfills under conditions that are more or less well controlled.

Thus, one of the main applications of the invention is processing solid or liquid waste whether of household, hospital, or industrial origin, in order to obtain particles that are usable in various building and/or civil engineering materials, while satisfying all non-pollution criteria and standards for protecting people and the environment.

Numerous methods and equipments are known that attempt to solve the problem of processing waste to avoid developing landfills which, in addition to spoiling the appearance of the countryside, are also major sources of pollution; waste is becoming more and more abundant, and even storing it in landfills is expensive.

The ever-increasing cost of this type of waste "disposal" together with the fact that landfill sites are becoming full to overflowing, make it necessary to find some other solution.

In the near future, industrialized countries are thus going to be constrained to take measures that seek to protect the environment; landfills as we now know them in which residues of all kinds are allowed to accumulate will have to be phased out in favor of processing centers.

At present, 65% of waste is thus dumped without transformation in landfills, while the remaining 45% is processed.

There are three categories of processing family, not including composting which nevertheless applies to about 10% of waste but which does not actually process it.

(1) Incineration which is the only method to be genuinely industrialized at present on a large scale, and which processes 35% of waste. However it does not make true utilization of the waste possible, even if it is possible to recover heat that can be used in urban or community heating: in addition, that method generates both atmospheric pollution by exhausting toxic gases, and also combustion by-products that still need to be stored and that are also dangerous, over time.

(2) Anaerobic fermentation of organic matter in liquid form, in particular household refuse, but only a few units are presently in operation. This method makes it possible firstly to produce a methane-rich fuel gas, and secondly to recover particulate solids which, once dried, provide fuel material, together with digested matter which can be used as fertilizer.

In this category, mention may be made of patent application FR 2 577 940 published on Aug. 29, 1986 and patent application FR 2 551 457 published on Mar. 8, 1985 filed jointly by the firms UIE and VALORGA, and by Mr. DUCELLIER and Mr. PAVIA, which applications relate to methods and installations for degrading products, by-products, and organic waste under anaerobic conditions.

Unfortunately, that family of methods requires an installation that is large (a digester or fermenter having a minimum volume of 3000 $m^3$), which is quite complex, which needs to withstand corrosion, and which needs energy and additives to be fed thereto and also equipments for recovering and storing gas; in addition, it is not possible to treat all types of waste therein so this type of processing is experiencing difficulty in being developed.

(3) Accelerated mineralization by chemical reaction using quicklime, essentially to destroy organic matter, and various processing additives such as heating, adding other reagents, grinding, and compacting in order to obtain a residue that is theoretically reusable.

Various types of method have been investigated in this category of processing, and some constitute the subject matter of patent applications such as FR 2 472 421 published on Jul. 3, 1981 and filed by Mr. GERONIMO, FR 2 583 742 of Dec. 26, 1986, by LOMA FINANCE, and EP 427 899 of May 22, 1981 by the Swiss company GOMACRIS, all three of those applications mentioning Mr. BIEZ as inventor. Another relevant application is FR 2 612 427 of Sep. 23, 1988 by the Swiss firm CATHEL. Nevertheless none of those patent applications has given rise to genuine industrial implementations on a significant scale, because all of those various methods within the same processing family are, in fact, the results of empirical experiments without any explanation of the chemico-physical steps that enable the result to be achieved, the descriptions thereof tending more to recipes in alchemy than to industrial practice; and as a result the products obtained do not have the stated characteristics in repetitive manner and on a large scale, because:

firstly, their characteristics depend on the makeup of the waste processed, with some of the patents requiring at least 30% of cellulose matter, for example, thereby putting very stringent limits on the application of such methods;

secondly, the proposed processes do not eliminate either ferrous and/or heavy metals or heavy metals in the form of organometallic complexes, even though they are nevertheless a major source of pollution; and finally, the empirical nature of the experiments gives rise to implementation difficulties, and does not enable genuine applications to be achieved on an industrial scale.

The present invention, which is nevertheless situated in this particular processing category, enables methods to be implemented which are firstly well defined since they are explained and therefore reliable and repetitive, and which are secondly capable of providing a result that complies with the required standards by using specific means and steps that are neither taught nor suggested in the prior art, and without it being necessary, for example, for the treated waste to include a minimum quantity of cellulose matter.

The problem posed is to be able to provide units for processing solid or liquid waste of household, industrial and/or inactivated hospital origin, and regardless of the composition thereof, for the purpose of being transformed without additional polluting secondary waste or residue into one or more products that are chemically and bacteriologically inert so that there is no need for the material coming from the processing to be dumped in a landfill, since the material is reusable. Such processing must enable the waste to be recovered without risk of future pollution and in particular leach water from the resulting-products, must provide analyses that comply with regulations concerning heavy metal content in particular, and even when heavy metals are present in the initial waste in unusually large quantity.

Another object of the present invention is to be able to run and manage such processing units in such a manner as to remain fully in control of operations that are taking place in application of a method that is well defined both technologically and chemically, that is capable of being industrialized, and that guarantees the above results, which processing units must be capable of being displaced and moved on transportable platforms in order to enable processing operations to be performed on site where the waste is produced, thereby avoiding difficult and expensive transport and handling operations that can give rise to pollution.

A solution to the problem posed is a method of processing and recovering waste that has previously been ground up and cleared of any ferrous metal parts, in which the resulting particles are checked for water content which is then adjusted to lie in a given range, and are then caused to react by adding mineralizing agents, including at least one alkaline-earth metal oxide such as quicklime and an alkaline-earth metal salt such as calcium carbonate, at a temperature exceeding 130° C. and below the pyrolysis temperature for the components that are most sensitive to being degraded by heat, in which method, according to the invention:

the particles and the reagents are continuously kneaded and ground, ensuring that the components are intimately and uniformly mixed, while keeping the grain size thereof below 1 mm; and alumina and a derivative of silicic acid are added on-site to the preceding mixture in such a manner as to create hexahydroxyl silicate cage molecules therein that capture and trap within them cations of small atomic radius, such as the cations of any heavy metals that are still present in the mixture.

In a preferred embodiment, after the waste has been cleared of any ferrous metal content, any non-ferrous metal content is eliminated by means of any equipment based on using eddy currents.

Also preferably, an alkali metal hydroxide, e.g. caustic soda, is added to the particles, so as to obtain total hydrolysis of the products.

Likewise, in order to improve efficiency and to increase the effectiveness of the mineralization reactions, the resulting particles, after the metal content has been eliminated therefrom and after the water content has been adjusted, are preferably caused to react successively with mineralizing agents that are added to the mixture one after another in the following order:

an alkaline-earth metal oxide is initially added (5) to the particles, and preferably quicklime which hydrates on coming into contact with the waste to give slaked lime:

thereafter an alkaline-earth salt is added to the mixture, preferably a salt such as calcium carbonate;

alumina;

an alkali metal hydroxide, preferably such as caustic soda; and the derivative of silicic acid, which may have acid properties such as the chloride of silicic acid, or basic properties such as the silicate of sodium or potassium.

To achieve the object of exploiting the waste, after the particles have been processed chemically, they are dehydrated so as to obtain a powder and the resulting dry powder is mixed with a binder constituted by a nonflammable synthetic resin that makes the particles rigid and waterproof.

The various steps of the above method may be implemented using any known equipment adapted for that purpose, or else with specific equipment, but given the way in which each of the steps is identified and the possibility and even the recommendation that each of the steps should be performed successively in a specific order, it is possible to use equipment that is modular and suitable for connecting in series so as to process waste continuously, thus obviating any need for a reactor of large capacity: this means that apparatus can be made that is quite compact, mobile, and easily transported to processing sites, thus satisfying one of the objects of the present invention, and a preferred embodiment thereof is described below that satisfies the specified criteria.

The result is novel methods and apparatuses for processing and exploiting waste, transforming the waste into materials that are not polluting and that are reusable.

These methods and apparatuses overcome the various drawbacks of the presently known equipments mentioned above, and also satisfy the defined problems and objects.

According to the present invention, the method implemented makes it possible to process any kind of waste, whether household waste, industrial waste, or inactivated hospital waste, without any restrictions on the percentages of the substances making up the waste, and that is not true for most of the patent applications that apply to this category of processing: the invention makes it possible, in particular, to deal with sludges that are considered as being highly polluting, such as tanning sludge, sewage sludge, and paper-making sludge, for example.

The method of the invention may be considered as a mineralization method made up of a succession of complex reactions with various reagents: the compounds that contribute to all kinds of polluting matter, whether organic or inorganic, are extremely varied, and the various reactions that are then possible between such compounds and the added reactive mineralizing agents are likewise very complex, and cannot be described individually. It is therefore appropriate to deal with the reaction aspect in an overall manner as described below.

The object of the invention is to process waste of any origin whatsoever using the same industrial equipment that is capable of adapting to the nature and the quantity of the reagents used: nevertheless, it is known that for a given geographical sector, the overall composition of waste can be considered as being relatively stable; accurate analysis of the composition therefore makes it possible to define the operating conditions of the apparatus of the invention prior to use, together with the quantities and the kinds of the reagents that need to be implemented: the invention puts no restriction on possible uses of the method because of the respective quantities of components making up the waste; thus, for example, the content of cellulose matter in the waste is immaterial.

As indicated above, the method and the apparatus of the invention are capable of being mounted on freestanding platforms so as to enable processing to be performed close to the sources of pollution. Processing units may have capacities that correspond, for example, to waste production of the order of 10,000 to 250,000 equivalent inhabitants, by targeting processing at a rate of 3 to 10 (metric) tons per hour.

The products obtained at the end of processing may be used for fabricating bricks and building blocks by using a hydraulic binder or a synthetic organic binder, for preparing road surfacing material, for filling quarries, for lightening structures, etc.

To demonstrate the absence of risk for the environment of the resulting products, leaching water has been analyzed, i.e. water obtained by rinsing a powder of such products as derived from waste processed by the method implemented in the present invention, at the analysis shows protection of a quality that bears no resemblance with that obtained by the other method.

By way of information, the following values have been obtained by processing household waste from a landfill that receives garbage from an urban environment:

| Total heavy metal content | mmg/kg | Standard |
|---|---|---|
| Cd | 0.5 | 10 |
| Cu | 19 | 200 |
| Ni | 37 | 200 |
| Pb | 20 | 100 |
| Zn | 145 | 1,000 |
| Hg | 0.2 | 5 |
| Cr | 45 | 50 |

It should be observed that although the above results were obtained without prior elimination of any pieces of non-ferrous metal, by means of any equipment based on using eddy currents, which is nevertheless a preferred step of the method of the invention, a depollution rate is observed lying in the range 60% to 90% relative to the initial concentrations of heavy metals.

Other advantages of the present invention could be mentioned, but those given above are already sufficient to demonstrate the novelty and the advantages of the invention.

The following description and drawings show an embodiment of the invention but they are not limiting in any way: other embodiments are possible within the ambit of the scope and the extent of the present invention, in particular by using other means for mixing and homogenizing the particles.

For example, without going beyond the ambit of the invention, it is possible to envisage processing in a large-capacity vat, with a preferably horizontal moving static furnace, making it possible to perform batch processing using successive reaction steps; that would lose the advantage of continuous processing, that makes it possible to reduce the size of the equipment used, thus making it possible, inter alia, to provide mobile and transportable processing units; in addition, in order to obtain thoroughly homogenized mixing that is also intimate and provides a small grain size, it is preferable for the equipment to be organized as described below.

Figure 2:
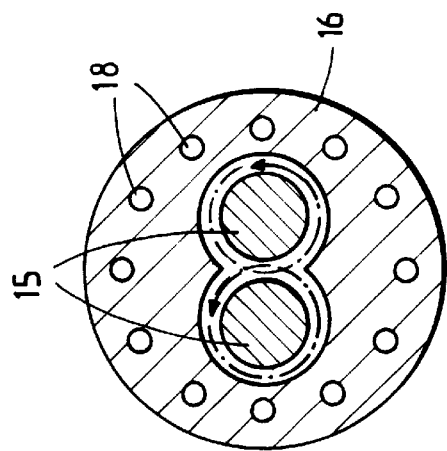
FIG. 2 is a simplified cross-section through an example of the reactor shown in FIG. 3.

Upstream from the waste processing and exploiting device 1, the waste must initially be ground up into particles in any conventional equipment, such as a shredder followed by a knife or hammer mill if the waste is industrial or household waste, and if the waste is hospital waste then it needs to be subjected to specific additional prior processing to inactivate it prior to being fed to apparatus of the invention.

For this purpose the particles of such hospital waste must be immersed in a tank containing a bactericidal and viricidal disinfectant that operates by the surface-active effect, for example, enabling the population of microorganisms, funguses, and viruses to be destroyed to nearly 100% in application of standards such as those issued by Afnor (the French standards organization), so as to be effective against microorganisms, bacteria (such as NFT 72 151 and NFT 72 171), funguses (as defined in NFT 72 201), viruses (such as NFT 72 181), including the HIV1 virus; the loading hopper for such waste is preferably provided with a shutter drawer placed in such a manner as to ensure that it is not possible for the operators to be splashed.

After passing through the above disinfection vat, the particles are then dried and may be injected in the same manner as waste from other industrial and/or household origins, into the common transformation circuit that is described below and that serves to process it.

The first stage of the method and of processing is applied, after the waste has been reduced to particles, and consists in removing from it of any ferrous metal, e.g. by using a magnetic field in any known manner at 2.

In addition, in order to eliminate any non-ferrous metal that is not eliminated by the preceding equipment, the apparatus of the invention includes, prior to the reaction chamber 21, equipment 3 based on using eddy currents, which equipment generates microwave fields that make said pieces of metal magnetic and therefore capable of being eliminated, which pieces of metal are amongst the items that pollute the most.

Prior to introducing the ground particles into the reaction chamber 21, the moisture content of the particles is measured and corrected if necessary, by using apparatus 4 for hot drying in association with moistening means so as to obtain a water content of 10% to 40%, i.e. for 1000 kg of waste fed into the reactor 21, a dry matter content lying in the range 600 kg to 900 kg, which is used as the base relative to which the percentages of the subsequently added mineralizing reagents are calculated.

Figure 3:
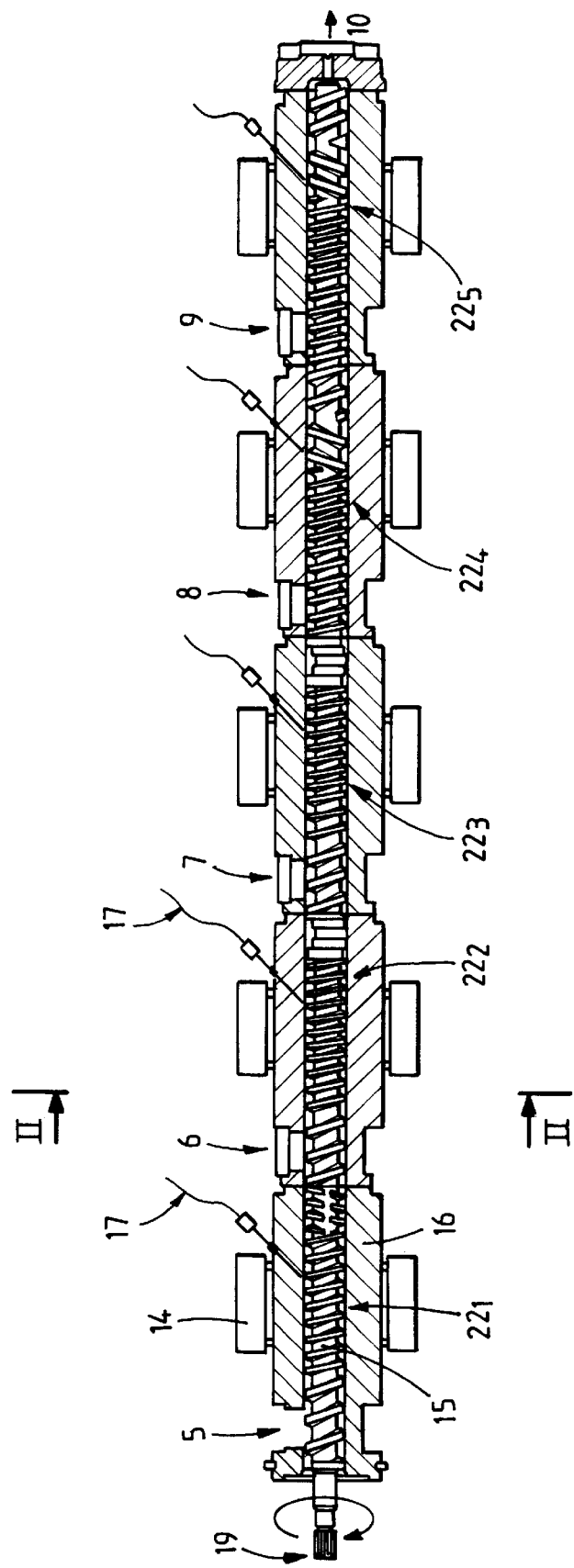
FIG. 3 is a longitudinal section through an example of a reactor for performing continuous processing.

The reactor or reaction chamber 21 used for implementing the method of the invention may be described as being an elongated zone comprising a combination of a set of reaction chambers 22, e.g. as shown in FIG. 3, with each of them having a function that is essential in the running of the mineralization process.

As the particles are continuously moved through the elongated zone of reactor 21, they are homogenized and cut up to obtain a grain size that is as fine as possible, with this being done by any means 20 capable of simultaneously entraining the particles and grinding them smaller.

The size of the resulting particles determines the transit time they require through the reactor: the smaller the particles the shorter their transit time since the reaction surface area is then relatively larger, and particles are processed to the core more effectively and more quickly.

The maximum acceptable grain size is 1 mm, and the preferred grain size lies in the range 100 $\mu$m to 500 $\mu$m.

The particles are fed into the reactor 21 initially together with an alkaline-earth metal oxide, such as quicklime, at a quantity that is adapted to the nature of the waste to be processed, i.e. in the range 10% to 40% of the dry extract as defined above; the lime then destroys organic cells by destructing biopolymer chains.

Thereafter, while the mixture is still in the homogenizer, an alkaline earth metal salt is added at 6, e.g. calcium or magnesium carbonate, possibly together with a small fraction of the chloride of the same alkaline earth, and preferably in such a manner as to ensure that the quantity of calcium carbonate lies in the range 5% to 10% of the dry content, for example, while the quantity of calcium chloride lies in the range 0.025% to 0.05% of said dry extract, for example.

The above two reagents serve in combination with the quicklime to provide good cohesion by participating in the decomposition of organic acids in order to create carbonic acids.

The use of such reagents provides numerous advantages, because:

carbon dioxide gas emission is recovered:

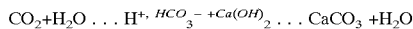
$$CO_2 + H_2O \ldots H^+, {}^{HCO_3^-} {}^{+Ca(OH)_2} \ldots CaCO_3 + H_2O$$

when quicklime is selected as the alkaline earth; p1 nitrogen-containing emissions due to decomposition of organic matter are recovered, e.g. as follows:

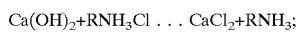
$$Ca(OH)_2 + RNH_3Cl \ldots CaCl_2 + RNH_3;$$

polluting and malodorous gases are eliminated with calcium sulfate being formed:

$$Ca(OH)_2 + SO_2 \ldots CaSO_4, 2H_2O;$$

any bases present in the medium are neutralized, even though such neutralization is secondary compared with that obtained below with silicic acid:

$$CaCl_2 + H_2O \ldots Ca(OH)_2 + MCl;$$

acids and anhydrides are neutralized since the oxides and halides of alkaline earth metals such as calcium react with water to give hydroxides which constitute strong bases:

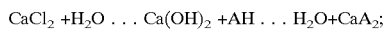
$$CaCl_2 + H_2O \ldots Ca(OH)_2 + AH \ldots H_2O + CaA_2;$$

where the last two reactions require the addition of calcium chloride, for example, in the event that the above reaction for recovering nitrogen-containing emissions does not produce a sufficient quantity thereof Other properties are also observed, such as sulfurization and the formation of polysulfide, and also the dehydro-halogenation of certain compounds which may also be of advantage.

At this stage, it may be appropriate to add a small quantity of alumina. This additive has the effect of partially regularizing the pH of the particles if it has become too high, however this characteristic is not essential at this stage of mineralization, since pH reduction is obtained by the addition of acid as described below. Nevertheless, in the above conditions, by adding alumina, the resulting aluminate ion can be at the origin of numerous complexes being formed with the above by-products, of which the most important is calcium sulfo-aluminate in mineral form.

Other anions such as chlorides, bromides, nitrates, manganates, and chromates are trapped to form alumina complexes: the quantity of alumina fed in for that purpose at 7 preferably lies in the range 0.1% to 0.2% by weight of the above-defined dry extract.

According to the invention, an alkali metal hydroxide such as caustic soda or caustic potash is then added to the particles in order to hydrolyse the products completely.

For this purpose, the particles or mixture is subjected to a temperature of 150° C. to 300° C. in the hydrolysis chamber 224, whereas in the preceding chambers, the temperature is kept high because of the exothermal nature of the above chemical reactions, which can even make it necessary to cool the enclosures of said chambers.

This basic hydrolysis constitutes the final stage of mineralization by hydrolysis of any organic matter such as proteins, DNA, RNA, carbohydrates, lipids, etc. that have already been partially decomposed by the lime in the preceding reaction process.

The quantity of alkali metal hydroxide, such as caustic soda, that is added for this purpose at 8 lies in the range 3% to 20% by weight of the previously defined dry extract.

After this mineralization, at least one acid or basic hydrolyzable derivative of silicic acid 9 is added to the mixture, e.g. silicic acid chloride at a concentration of 0.1% to 1% of the dry extract, or sodium silicate at a proportion of 0.1% to 0.2% together with hydrochloric acid at a proportion of 1% to 2%: these compounds react with the residual water and the previously added alumina present in the reaction medium to form stable silico-aluminates that are not very soluble in water. This property is due to the fact that alkali silicates generate orthosilicic acid reacting in a basic medium to give hexahydroxyl silicates in ionic form: $Si(OH)_4 + 20H^- \ldots [Si(OH)_6]^{--}$.

This hydric structure makes it possible to capture small atomic radius metal cations such as $Mg^{++}$, $Al^{+++}$, $Fe^{+++}$, or cations of heavy metals.

This characteristic is essential and specific to the present invention since it makes it possible to trap small atomic radius cations such as those of heavy metals still present in the mixture, and that have not already been eliminated during prior steps 2 and 3, even though they constitute cations that are dangerous for the environment.

In addition, the advantage of silicic acid is that it enables the pH level which is generally high as mentioned above, to be brought to a value of less than 10, and possibly even smaller depending on the type of utilization that is intended for the product of the method; in addition this acid is not dangerous since it is to be found everywhere, and it is therefore possible to add any desired quantity thereof: it is thus possible to adjust the quantity thereof as a function of the makeup of the waste and of the desired pH without any problems, and excess acid may be added to be certain of trapping all of the heavy metals.

At the outlet from the elongated zone of the reaction chamber or reactor 21 as defined above, the apparatus of the invention may include dehydrating equipment 11 into which the product 10 at the end of chemical processing is fed in order to be dried therein, e.g. under a vacuum and at a temperature of about 100° C.

The dried powder obtained in this way can be mixed at 12 with a binder constituted by a non-flammable synthetic resin such as polyurethane which impregnates it uniformly: after such mixing, the resin mortar can be passed through a high pressure press or an extruder type device in order to compact the mixture including the binder, thereby ensuring cohesion and waterproofing between the particles.

The conditions of use of products derived from waste exploited in this way determine whether the resin is chosen because it is the cheapest, the best at withstanding hydrolysis, the least polluting, etc. . . . . .

Figure 1:
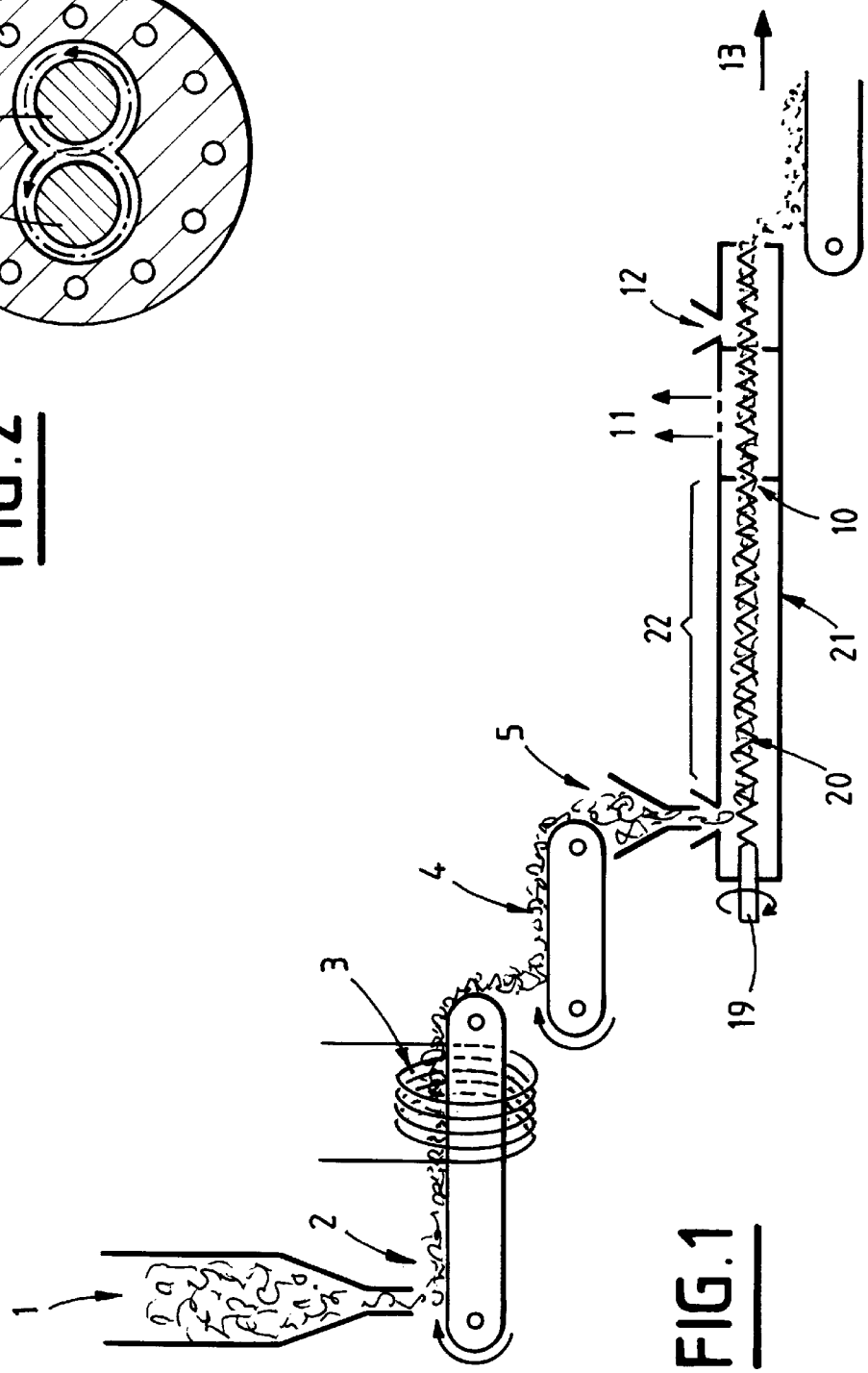
FIG. 1 is a diagrammatic view of complete apparatus of the invention.

FIGS. 2 and 3 show a particular embodiment of a reactor for performing continuous processing and making it possible firstly to perform the processing in application of the method of the invention, and secondly to provide a physical embodiment of the apparatus shown in FIG. 1.

The reaction chamber 21 includes at least one continuous chute or elongated reaction zone 16 containing at least one Archimedes' screw 15 which is rotated by any appropriate external means 19 and which moves the ground material along said elongated zone the chute comprising a plurality of successive, chambers 22 into each of which one of said mineralizing As shown in FIG. 3, the portion of the Archimedes screw 15 adjacent the introduction 5 to the hopper 16 and/or adjacent the beginning of the successive chambers 22 has a different configuration, for example, the pitch of the screw, from the remainder of the screw 15 so as to receive the mineralizing agents injected at 5, 6, 7, 8, and 9 and admixed with the particles in the hopper 16. The Archimedes' screw 15 ensures that the particles are mixed continuously, intimately, and uniformly together with the added mineralizing reagents, and also it keeps the grain size to less than 1 mm, and finally it conveys the particles from the upstream inlet 5 shown on the left of the figure to the downstream outlet 10 after it has been chemically processed, and and beyond through the dehydrating chamber 11 and the binder-adding chamber 12 as described with reference to FIG. 1 so as to obtain a product that is reusable.

FIG. 2 is a cross-section through the apparatus of FIG. 3, showing a reaction chamber 21 containing two co-rotating Archimedes' screws 15. In each of the chambers 22 and then the chambers 11 and 12, the Archimedes' screws are made of materials that are appropriate depending on the type of reaction and the type of mixing specific to the added reagent.

Each of the chambers may be fitted with heating adapted to the various requirements, e.g. indirect heating means, such as an external thermal system 14 or a system 18 for an internally circulating heat-conveying fluid which makes it possible by means of any appropriate instrumentation 17 to monitor said temperatures and adjust them to optimize the reaction in each of the chambers.

In the prior stage of putting such apparatus into operation, and then subsequently while it is running, the reaction products obtained upstream and downstream from the various chambers can be sampled to verify that the reactions are complete, as defined above, and thus enabling various proportions to be readjusted, should that be necessary, under the conditions mentioned above, so as to obtain the desired residue that is depolluted, stable, solid, and waterproof.

Using apparatus as described above, processing lasts for a period that may be estimated at a maximum of 10 minutes, and the operation of the set of equipment used, the drive of the Archimedes' screws, and the heating and/or cooling may all be performed in such a manner as to use electrical energy only, or thermal energy or mechanical energy from any source, or a combination of various sources of energy.

We claim:

1. A method for processing and recovering waste which has been ground up into particles and from which ferrous metal has been removed, which comprises:

determining the water content of the ground particles and, if necessary, to achieve the following water content, adjusting the water content to lie in a range of 10% to 40% by weight based on the total water content and dry content of the ground particles, introducing the ground particles into an elongated reaction zone, adding to the ground particles introduced into the elongated zone mineralizing agents including at least one alkaline earth metal oxide and at least one alkaline earth metal salt, continuously moving the ground particles admixed with the mineralizing agents along the elongated reaction zone while kneading and grinding said admixture to effect an intimate mixing of the particles and the added mineralizing agents so that the particles and agents are uniformly mixed and so as to maintain a grain size of the admixture below 1 mm, the ground particles and mineralizing agents being caused to react exothermally within the elongated reaction zone at a temperature exceeding 130° C. but below the pyrolysis temperature of any components in the ground waste which upon degradation would produce toxic gases so as to cause atmospheric pollution, and adding at least a silicic acid or a hydrolyzable derivative thereof in the presence of alumina to the continuously moving admixture thus formed at a location spaced downstream from the location of the addition of the mineralizing agents, said alumina reacting with the silicic acid or hydrolyzable derivative thereof to form stable silico-aluminates so as to create hexahydroxyl silicate cage molecules capturing and trapping therein cations selected from the group consisting of $Mg^{++}$, $Al^{+++}$, $Fe^{+++}$ and heavy metal cations present in the admixture.

2. A method according to claim 1, which includes eliminating non-ferrous metal remaining after the ferrous metal has removed by generating microwave fields so as to make any such non-ferrous metal magnetic so as to make such non-ferrous metal capable of being eliminated.

3. A method according to claim 1, which includes adding an alkali metal hydroxide to the particles in the elongated confined reaction zone at a location spaced downstream from the location of the addition of the mineralizing agents so as to achieve substantially total hydrolysis of products in the admixture.

4. A process according to claim 1, in which there are added to the ground particles the following agents in the following sequence:

the alkaline earth metal oxide, the alkaline earth metal salt;

the alumina;

the alkali metal hydroxide; and the silicic acid or derivative thereof.

5. A method according to claim 1, which includes dehydrating the admixture after the particles have been previously reacted in the elongated reaction zone so as to obtain a dry powder.

6. A method according to claim 5, which includes mixing the resulting dry powder with a binder constituted by a non-flammable synthetic resin which makes particles rigid and waterproof.

7. A method according to claim 1, in which the elongated zone comprises at least one continuous hopper and contains at least one Archimedes screw which is rotated therein so as to move the particles along said hopper, said hopper comprising a plurality of successive chambers, wherein a given mineralizing agent is introduced into a particular zone, said Archimedes screw serving to provide continuous mixing so as to effect an intimate and uniform mixture of the particles and of the added mineralizing agents and to maintain a grain size of less than 1 mm.

8. A method according to claim 7, wherein there are two co-rotating Archimedes screws in said hopper.

9. A method according to claim 7, wherein the portion of the Archimedes screw adjacent the introduction to the hopper and/or adjacent the beginning of the successive chambers has a different configuration from the remainder of the screw so as to receive the mineralizing agents or other additives admixed with the particles in said hopper.

10. A method according to claim 1, wherein the alkaline earth metal oxide comprises quicklime.

11. A method according to claim 1, in which the alkaline earth metal salt comprises calcium carbonate.

12. A method according to claim 11, in which the alkaline earth metal salt also comprises calcium chloride.

13. A method according to claim 3, in which the alkali metal hydroxide comprises caustic soda.

14. A method according to claim 1, wherein the respective mineralizing agents are added successively at different points along the elongated reaction zone.

15. A method according to claim 7, which comprises providing indirect heating means exteriorly of or internally of the hopper to adjust the temperature within the chambers.

16. A method according to claim 1, in which the alumina is added in a step prior to the addition of the silicic acid or derivative thereof.

* * * * *